United States Patent [19]

Moore et al.

[11] Patent Number: 5,050,337
[45] Date of Patent: Sep. 24, 1991

[54] TRAP SETTING DEVICE

[76] Inventors: Nathan J. Moore; Arthur R. Moore, both of 2263 County Rd. H, Deer Park, Wis. 54007

[21] Appl. No.: 478,612

[22] Filed: Feb. 12, 1990

[51] Int. Cl.⁵ ............................................ A01M 23/28
[52] U.S. Cl. ...................................................... 43/97
[58] Field of Search .............. 43/96, 97; 81/415, 488, 81/3.55, 3.57; 254/131

[56] References Cited

U.S. PATENT DOCUMENTS

| | | |
|---|---|---|
| 1,067,526 | 7/1913 | Larison .................................. 43/97 |
| 1,184,558 | 5/1916 | Morton . |
| 1,472,217 | 10/1923 | Gufler . |
| 1,671,258 | 5/1928 | Seghers . |
| 1,830,261 | 11/1931 | Bunker . |
| 2,002,095 | 5/1935 | McCabe . |
| 2,059,119 | 10/1936 | Korbisser . |
| 2,311,178 | 2/1943 | Jorgensen . |
| 2,602,260 | 7/1952 | Marsden . |
| 4,391,167 | 7/1983 | Bergmeister ......................... 81/3.57 |
| 4,829,858 | 5/1989 | Kern et al. ............................ 81/415 |

*Primary Examiner*—Kurt Rowan
*Assistant Examiner*—James Miner
*Attorney, Agent, or Firm*—Peterson, Wicks, Nemer & Kamrath

[57] ABSTRACT

A device (10) for assisting in the safe setting of traps (12) is disclosed including an elongated handle (34) and a portion (36) for removable engagement with the cross bar (32) and arm (23) of the striker (16) of the trap (12). The removable engagement portion (36) includes a hook (38) for slideably receiving a length of the cross bar (32) and a finger (46) for abutting with the arm (23) at a point located on the opposite side of the striker (16) than the lip (40) of the hook (38) and in a nonlinear position relative to the connecting leg (44) of the hook (38). The device (10) may be positioned to overlie the striker (16) in its first, trapping position and then pulled outward to pull the lip (40) of the hook (38) beneath the cross bar (32) and with the finger (46) overlying the arm (23) of the striker (16). When the handle (34) is raised, the device (10) will pivot about the cross bar (32) inside of the hook (38) until the finger (46) abuts with the arm (23). Upon continued movement of the handle (34), the striker (16) will pivot relative to the base (14) of the trap (12) to its second, set position. After the trip bar (24) has been engaged with the trigger (28) and the trap (12) placed at the desired position, the device (10) may be moved inwardly to release the cross bar (32) from the hook (38) and then pulled outwardly from the trap (12) intermediate the cross bar (32) and the base (14) of the trap (12).

18 Claims, 1 Drawing Sheet

TRAP SETTING DEVICE

BACKGROUND

The present invention generally relates to devices for assisting setting of traps, in the preferred form, the setting of animal traps, and in the most preferred form, the setting of rodent traps for rats, mice, or the like.

Many types of rodent traps include a biased striker formed of wire bent in a rectangular shape. A common problem in setting such traps is that the striker often slipped out of the person's hand striking the other hand of the person which may be attempting to engage the trip bar with the trigger. Such striking may be extremely painful and even injurious especially for larger traps such as for trapping rats where the biasing force placed on the striker may be large. Similarly, due to the large biasing force of larger traps, greater force is necessary to move the striker to its set position and to hold the striker in its set position which increases the chances of the striker accidently slipping out of the grasp of the person setting the trap.

Prior attempts to solve problems in setting such traps have concentrated on redesigning the trap itself by incorporating members for purposes of holding and/or moving the striker. However, such traps have generally not been successful in the marketplace. One reason for this lack of market success is believed to be the fierce competition between manufacturers of such traps, with any added extras placing the trap at an economic disadvantage.

Thus, a need exists for a device which is an accessory to traps which assists the setting of such traps. Further, such devices should not require modification to existing trap designs and should be itself inexpensive to manufacture to make it affordable.

SUMMARY

The present invention solves these needs and other problems in the field of setting traps or the like by providing, in the most preferred form, a device including an elongated handle and a member for removable engagement with the cross bar and arm of the striker of the trap for moving the cross bar against its bias away from the entrapment member.

In a preferred aspect of the present invention, the device includes a hook for receiving the cross bar to pivotably attach the device about the cross bar and thus define a two point abutment therewith. The device further includes a finger which abuts the arm at a third point, with the third point being in a nonlinear position from the two point abutment of the hook and on the opposite side of the cross bar than the two point abutment of the hook.

It is thus an object of the present invention to provide a novel device for assisting in the setting of traps.

It is further an object of the present invention to provide such a novel trap setting device for rodent type traps including rectangular shaped strikers pivotably mounted to a base.

It is further an object of the present invention to provide such a novel trap setting device providing a leverage advantage in moving the striker against its bias.

It is further an object of the present invention to provide such a novel trap setting device which does not require the traps to be modified.

It is further an object of the present invention to provide such a novel trap setting device usable with most existing traps.

It is further an object of the present invention to provide such a novel trap setting device which is easy and inexpensive to manufacture.

It is further an object of the present invention to provide such a novel trap setting device which may be marketed as an accessory separate from the trap.

It is further an object of the present invention to provide such a novel trap setting device providing safe setting of traps.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
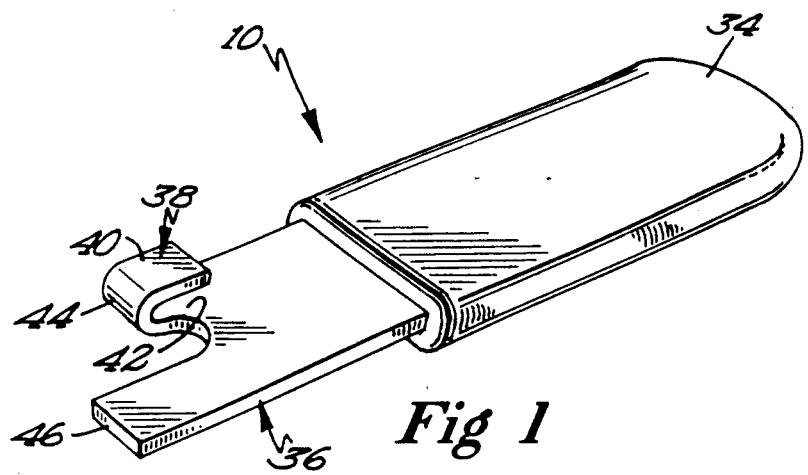
FIG. 1 shows a perspective view of a trap setting device according to the preferred teachings of the present invention.
Figure 2:
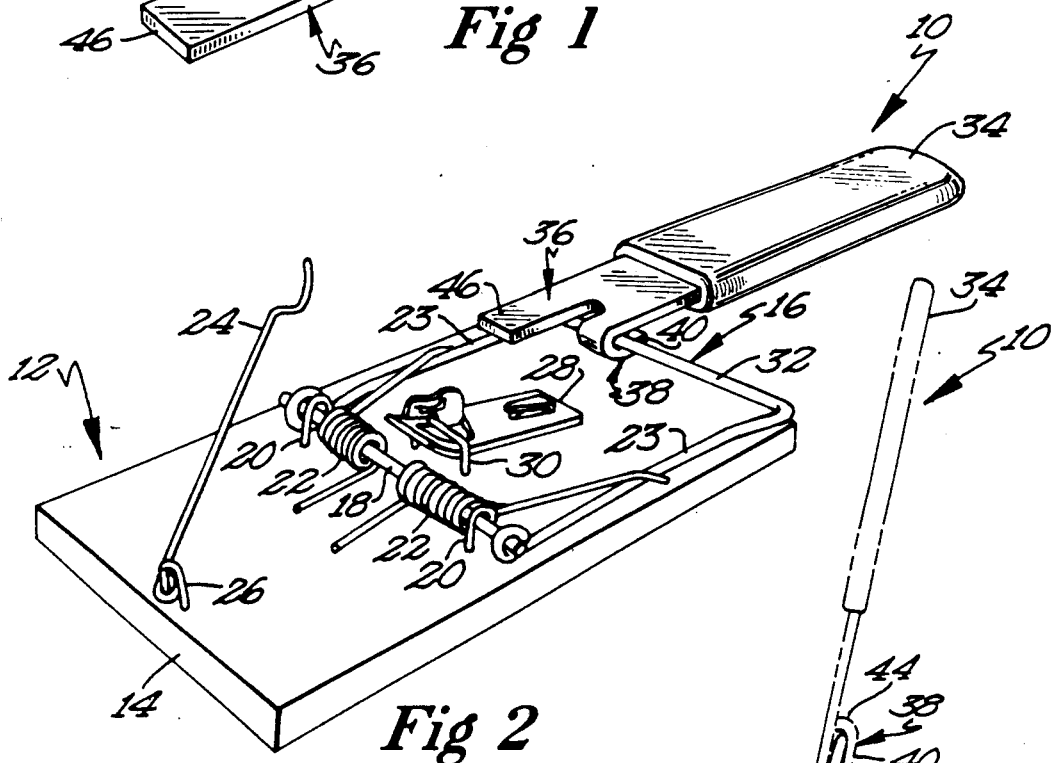
FIG. 2 shows a perspective view of the trap setting device of FIG. 1 removably engaged with a trap in a trapping position.
Figure 3:
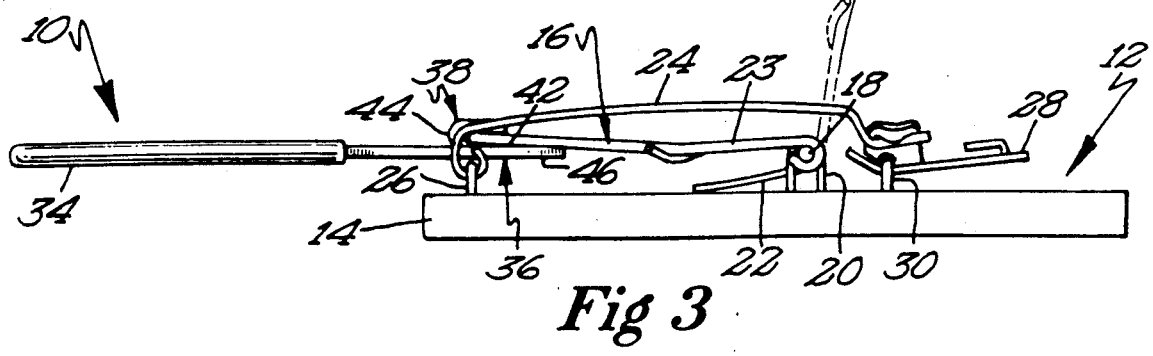
FIG. 3 shows a perspective view of the trap setting device of FIG. 1 removably engaged with a trap in a set position, with the striker of the trap and the trap setting device of FIG. 1 shown in phantom in an intermediate position.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "end", "lower", "upper", and similar terms are used herein, it should be understood that these terms have reference only to the structure shown in the drawings as it would appear to a person viewing the drawings and are utilized only to facilitate describing the invention.

DESCRIPTION

Device for assisting setting rodent or like animal traps is shown in the drawings and generally designated 10. Trap 12 generally includes a base 14 which may be made of wood or any other suitable material such as is commonly used in making traps of this character. A striker 16 is shown in the preferred form as a generally planar, approximately rectangular wire frame. One of the cross bars 18 of striker 16 is pivotably mounted to base 14 by staples 20 generally intermediate and parallel to the ends of base 14. One or two coil springs 22 are disposed around cross bar 18, with one end of the coil spring 22 extending over an arm 23 extending generally perpendicular to and thus in a nonlinear manner from cross bar 18 of striker 16. The other end of spring 22 extends against base 14. Springs 22 bias striker 16 into a first, trapping position, with base 14 adjacent striker 16 forming an entrapment member with which striker 16 abuts. Striker 16 may be held in a second, set position by a trip bar 24 having a first end pivotably secured to base 14 by a staple 26 and having a second end selectively held by a trigger 28. Trigger 28 may be in the form of a plate upon which the bait may be placed, with trigger 28 being pivotally mounted by a staple 30 for movement between an upper position where the second end of trip bar 24 may be engaged by and held by trigger 28 and a lower position where the second end of trip bar 24 is released by trigger 28. Bar 24 engaged by trigger 28 extends over cross bar 32 of striker 16 in its second, set position. Trap 12 may be of a variety of types and forms, which may be set utilizing device 10 of the preferred teachings of the present invention.

Device 10 generally includes an elongated handle 34 and an attached striker engagement portion 36 which in the preferred form is formed integral with handle 34. Handle 34 may have any desired shape and type such as that shown which may be easily grasped and manipulated by the user. For example, as shown in the most preferred form, handle 34 may include a plastic or similar covering. Striker engagement portion 36 includes provisions 38 for removable attachment to a length of cross bar 32 at a location spaced from an arm 23 of striker 16. In the most preferred form, provisions 38 are shown as a hook 38 formed by a finger bent or stamped into a generally U-shape, with hook 38 including a lip 40 extending generally parallel to the body 42 of portion 36 and a connecting leg 44 extending between and interconnecting lip 40 and body 42 generally perpendicular thereto. The spacing between lip 40 and body 42 is generally equal to but slightly larger than the diameter or thickness of cross bar 32. Thus, device 10 may be placed such that cross bar 32 extends across body 42 and is slideably received in hook 38 intermediate lip 40 and body 42 and adjacent leg 44. It can then be appreciated that device 10 is pivotable about an axis defined by cross bar 32 and which is generally parallel to leg 44 of hook 38.

Striker engagement portion 36 further includes provisions 46 for abutment with an arm 23 of striker 16 at a location spaced from cross bar 32. In the most preferred form, provisions 46 are formed by a finger 46 extending longitudinally from body 42 in a direction generally parallel to and spaced from hook 38. In the most preferred form, finger 46, body 42, and handle 34 are generally planar.

Now that the basic construction of device 10 according to the preferred teachings of the present invention has been explained, the operation and subtle features of device 10 can be set forth and appreciated. It will be assumed that striker 16 is located in its first, trapping position. Device 10 may be attached to striker 16 by placing body 42 of striker engagement portion 36 on top of cross bar 32, with cross bar 32 located in front of the leading edge of lip 40. Device 10 may then be slid such that lip 40 passes beneath cross bar 32 and intermediate base 14 and cross bar 32 and such that cross bar 32 passes intermediate lip 40 and body 42 and into hook 38 to abut with leg 44. Device 10 may then be moved such that finger 46 overlies arm 23. While holding base 14 stationary, handle 34 may be moved to pivot on cross bar 32 about hook 38 until an abutment position is reached where finger 46 abuts against arm 23 of striker 16. Upon continued movement of handle 34, device 10 will abut with striker 16 at least by two points defined by lip 40 abutting with cross bar 32 adjacent leg 44 and by a third point defined by finger 46 abutting with arm 23, with the third point being on the opposite side of striker 16 than and in a nonlinear position from the first two points. Striker 16 will then pivot upon base 14 about cross bar 24 from its first, trapping position to its second, set position. When striker 16 is in its second, set position, striker 16 will overlie body 42 and finger 46, and lip 40 will overlie cross bar 32. While holding striker 16 in its set position utilizing device 10, trip bar 24 may be safely engaged with trigger 28 such that trip bar 24 extends over cross bar 32 of striker 16 and holds it in its second, set position in the normal manner. After trap 12 has been set and placed down, device 10 may then be removed by moving device 10 inward towards cross bar 24 until hook 38 is removed from cross bar 32. At that time, device 10 may be lowered adjacent base 14 and at level below cross bar 32 of striker 16. Device 10 may then be removed from trap 12 by moving device 10 outwardly intermediate cross bar 32 and base 14 with hook 38 and finger 46 passing beneath cross bar 32.

It can be appreciated that striker 16 of trap 12 is firmly and securely held by device 10 according to the preferred teachings of the present invention while still allowing ease of attachment and detachment. Specifically, the three point abutment provided by holding cross bar 32 by hook 38 and finger 46 abutting with arm 23 prevents striker 16 from accidently slipping and striking the user's other hand attempting to engage trigger 28 and trip bar 24 to set trap 12.

Further, device 10 according to the preferred teachings of the present invention may be utilized to set traps 12 of various configurations of existing design and without modification. Specifically, traps 12 need not include provisions such as projection pins extending from the striker to allow attachment or use. Thus, device 10 according to the teachings of the present invention may be utilized on existing traps 12 of varying manufacture such that manufacturers of traps 12 are not faced with increased capital costs and/or manufacture costs resulting from redesign of traps 12 and such that it is not necessary for users to replace previously existing traps 12. Device 10 according to the preferred teachings of the present invention may be sold as an accessory separate and apart from traps 12.

Similarly, due to the length of handle 34 and of device 10, device 10 according to the preferred teachings of the present invention provides considerable leverage in moving striker 16 against the bias of springs 22. Additionally, device 10 is easy to hold and is less likely to slip from the person's grasp than when the person simply holds striker 16. Thus, accidental slipping of striker 16 is less likely to occur utilizing device 10 according to the preferred teachings of the present invention. Therefore, problems of the accidental striking of the person's hand while setting trap 12 which previously occurred may be eliminated utilizing device 10 of the present invention.

Furthermore, device 10 in the most preferred form of the present invention is of a simple, one piece design which may be inexpensively manufactured. Specifically, device 10 may be cut and stamped from flat sheet material in the most preferred form. Thus, the capital costs of casting and/or molding may be avoided in the manufacture of device 10 according to the preferred teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Device for assisting the setting of a trap, with the trap including a striker including a cross bar interconnected to an arm extending in a nonlinear manner from the cross bar, with the cross bar being movable and biased toward an entrapment member, comprising, in combination: an elongated handle; and means attached to the handle for moving the cross bar against the bias away from the entrapment member comprising a hook for removable engagement with the cross bar of the striker of the trap and a first finger for removable engagement with the arm of the striker of the trap, with the first finger extending longitudinally from the handle and including a free end, with the hook formed by a second finger separate from the first finger and extending from the handle generally parallel to and spaced from the first finger and formed into a generally U-shape, with the hook having a free end extending in a direction opposite to the free end of the first finger, with the first finger and the hook being nonmovable relative to each other.

2. The trap setting device of claim 1 wherein the hook removably, pivotably attaches the handle to the cross bar about a pivot axis defined by the cross bar; and wherein the first finger abuts with the arm of the striker to prevent pivoting of the handle about the cross bar beyond an abutment position.

3. The trap setting device of claim 2 wherein the hook is of a size generally equal to but slightly larger than the cross bar for slidable receipt of a length of the cross bar.

4. The trap setting device of claim 3 wherein the first finger extends integrally and longitudinally from the handle for abutment with the arm.

5. The trap setting device of claim 4 wherein the handle and the first finger are generally planar and formed from sheet material.

6. The trap setting device of claim 5 wherein the second finger extends integrally from the handle and is formed from sheet material bent into the generally U-shape to form the hook.

7. The trap setting device of claim 3 wherein the striker of the trap is generally rectangular and includes a second cross bar and a second arm, with the second cross bar being pivotably mounted to the entrapment member, with a spring extending between the entrapment member and the striker for biasing the cross bar toward the entrapment member.

8. The trap setting device of claim 2 wherein the first finger extends integrally and longitudinally from the handle for abutment with the arm.

9. The trap setting device of claim 8 wherein the handle and the first finger are generally planar and formed from sheet material.

10. The trap setting device of claim 9 wherein the second finger extends integrally from the handle and is formed from sheet material bent into the generally U-shape to form the hook.

11. The trap setting device of claim 1 wherein the striker of the trap is generally rectangular and includes a second cross bar and a second arm, with the second cross bar being pivotably mounted to the entrapment member, with a spring extending between the entrapment member and the striker for biasing the cross bar toward the entrapment member.

12. The trap setting device of claim 11 wherein the entrapment member comprises a base, with the first cross bar being pivotable parallel to an axis defined by the second cross bar between a first, trapping position and a second, set position, with the first cross bar being biased towards the first, trapping position.

13. Device for assisting the setting of a trap, with the trap including a striker including a cross bar interconnected to an arm extending in a nonlinear manner from the cross bar, with the cross bar being movable and biased toward an entrapment member, comprising, in combination: an elongated handle; and first and second fingers attached to and extending longitudinally from the handle and parallel to and spaced from each other for abutting with the cross bar and the arm of the striker at least at a three point abutment for moving the cross bar against the bias away from the entrapment member, with the second finger being in a U-shape for abutting with the striker at first and second points on the opposite side of the striker than a third point that the first finger abuts with the striker, with the third point being in a nonlinear position from the first and second points, with the handle and first and second fingers being of a one-piece construction.

14. The trap setting device of claim 13 wherein the hook is of a size generally equal to but slightly larger than the cross bar for slideable receipt of a length of the cross bar.

15. The trap setting device of claim 14 wherein the first finger extends integrally and longitudinally from the handle for abutment with the arm.

16. The trap setting device of claim 15 wherein the handle and the first finger are generally planar and formed from sheet material.

17. The trap setting device of claim 13 wherein the first finger extends integrally and longitudinally from the handle for abutment with the arm.

18. The trap setting device of claim 17 wherein the handle and the first finger are generally planar and formed from sheet material.

* * * * *